(12) United States Patent
Hamadi et al.

(10) Patent No.: US 7,975,234 B2
(45) Date of Patent: Jul. 5, 2011

(54) GRAPHICAL ACQUISITION OF AN OBJECTIVE FUNCTION

(75) Inventors: Youssef Hamadi, Cambridge (GB); Stephanie Ubeda, Lyons (FR)

(73) Assignee: Microsoft Corporation, Redmond, WA (US)

( * ) Notice: Subject to any disclaimer, the term of this patent is extended or adjusted under 35 U.S.C. 154(b) by 1106 days.

(21) Appl. No.: 11/548,399

(22) Filed: Oct. 11, 2006

(65) Prior Publication Data

US 2008/0092086 A1    Apr. 17, 2008

(51) Int. Cl.
*G06F 3/00* (2006.01)
*G06F 3/048* (2006.01)

(52) U.S. Cl. ...................................... 715/763; 715/762

(58) Field of Classification Search .................. 715/763, 715/762
See application file for complete search history.

(56) References Cited

U.S. PATENT DOCUMENTS

| | | | |
|---|---|---|---|
| 6,311,142 B1 * | 10/2001 | Glassner | 703/1 |
| 7,292,244 B2 * | 11/2007 | Vafiadis et al. | 345/440 |
| 7,483,030 B2 * | 1/2009 | Kass et al. | 345/473 |

* cited by examiner

*Primary Examiner* — Boris Pesin
*Assistant Examiner* — Sabrina L Greene
(74) *Attorney, Agent, or Firm* — Lee & Hayes, PLLC

(57) ABSTRACT

A user interface is described which displays a shape and enables a user to manipulate that shape by dividing it into a number of regions. Each region has an associated term which is made up from one or more constraints. A mathematical function, such as an objective function, is generated from the resultant graphical representation of the shape, where the function contains a term for each region and where each term is weighted according to the size of the corresponding region.

20 Claims, 13 Drawing Sheets

GRAPHICAL ACQUISITION OF AN OBJECTIVE FUNCTION

BACKGROUND

Many search applications exist today, for example for searching the internet, databases (e.g. for online shopping applications), file directories (e.g. for particular files or for selection of playlists) etc. Whilst some of these applications permit a user to search against more than one criterion, (e.g. filename contains "template" and was created within the last seven days), few provide the user with the ability to prioritize different criteria, which may be particularly advantageous to the user in some applications (e.g. on an online shopping website, where a user ideally would like to buy a red car which is less than one year old, but where color is less important than age).

Where applications do provide the ability to prioritize criteria, little flexibility is provided to enable the user to set up the search criteria. For example, a media player may provide a user with the following options:
  Create an audio playlist where:
    Tracks are stored in <file location>
    <add criteria here>
  And also include:
    <add criteria here>
  And apply the following restrictions:
    <add criteria here>
This user interface provides the user with three implicit levels of prioritization of the criteria that are selected, with the first set of criteria (listed after "create an audio playlist where:") being more important than the second set of criteria (listed after "and also include:"), which are in turn more important than the third set of criteria (listed after "and apply the following restrictions").

Mathematical optimization tools exist to enable a user to define a complex objective function, which can express the relative importance of a number of constraints. However, setting up the objective function using such tools is a complicated process even for a skilled user and unless set up correctly, the objective function may provide misleading or incorrect results when used for optimization.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

A user interface is described which displays a shape and enables a user to manipulate that shape by dividing it into a number of regions. Each region has an associated term which is made up from one or more constraints. A mathematical function, such as an objective function, is generated from the resultant graphical representation of the shape, where the function contains a term for each region and where each term is weighted according to the size of the corresponding region.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

Figure 1:
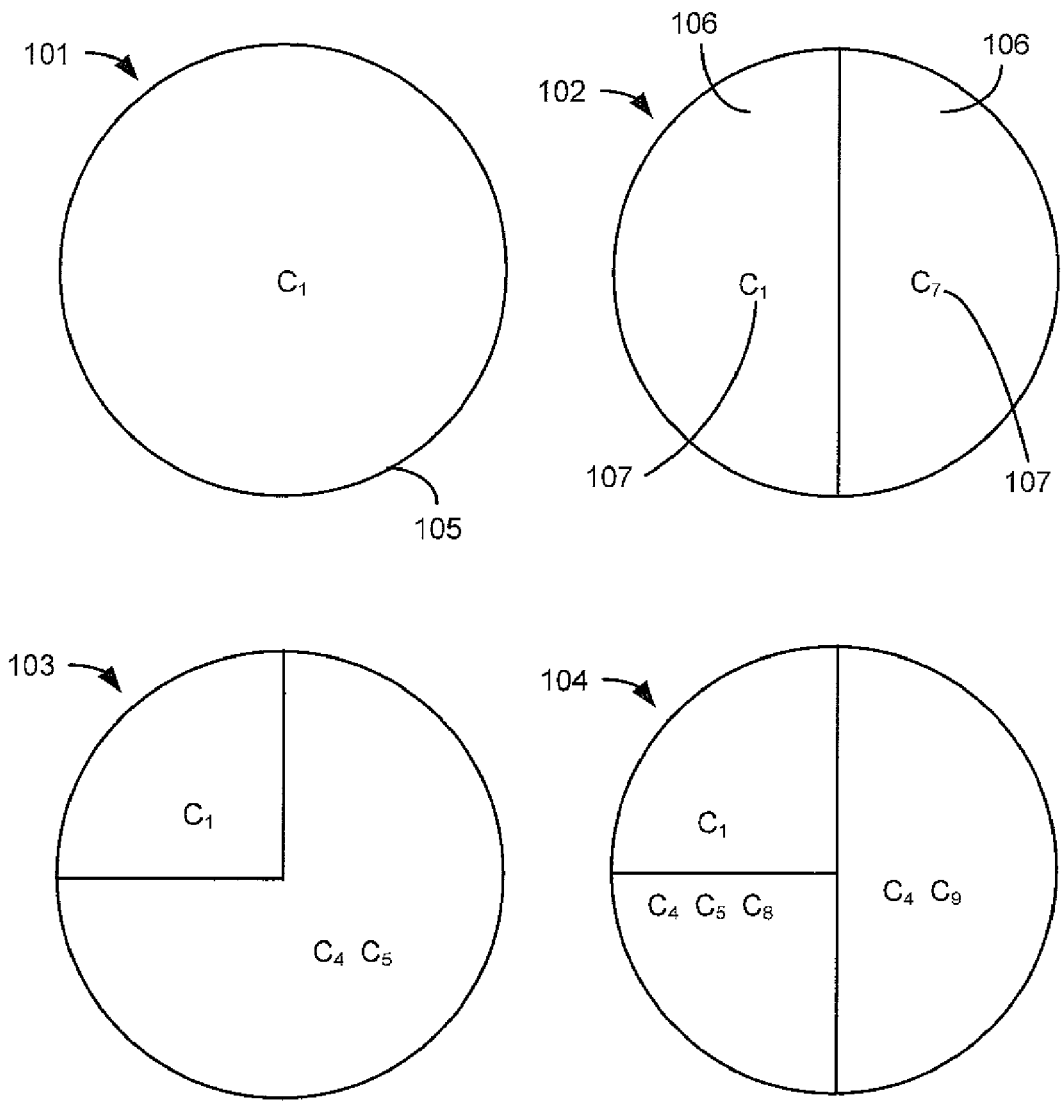
FIG. 1 shows graphical representations of four different objective (or goal) functions.

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

An objective (or goal) function may be used for optimization by enabling evaluation of the quality/cost of solutions to a problem. This evaluation may be based on a number of different constraints and the objective function includes weighting factors according to the relative importance or priority of different constraints or combinations of constraints (referred to herein as 'terms'). An objective function may be expressed as a combination of terms, where each term is an expression which can be evaluated as true or false (e.g. color=red) or as a numerical value and where the terms are combined using logical (e.g. AND, OR, XOR, NOT) and/or arithmetic operators. Two examples of an objective function are:

$$(color=red) AND (age<1\ year)$$

$$Car\_Color-Dress\_Color \leq 3$$

In the first example above, each term comprises a single constraint which is evaluated as true or false and a constraint comprises an attribute (e.g. color) an operator (e.g. is equal to) and a value (e.g. red). This combination of attribute, operator and value of which a constraint is comprised is also referred to as an 'instance' of an attribute. As these constraints relate to preferences, they are referred to as 'soft constraints'. In the second example above, each term is evaluated as a numerical value and the terms are combined using an arithmetic operator.

In order to be able to allocate different levels of importance to different terms, each term may have an associated coefficient or weight. For example:

0.75(term 1)+0.25(term 2)

Each coefficient may have a value between zero and one, with the sum of all coefficients being equal to one. For each solution, each term may be evaluated and the value of the solution is equal to the sum of the coefficients corresponding to terms evaluated to true. For example:

| Solution | Term 1 | Term 2 | Value |
|---|---|---|---|
| 1 | True | False | 0.75 |
| 2 | False | True | 0.25 |

In this example, both solutions satisfy only one term (i.e. one set of constraints) however, as term 1 was of higher priority (and hence had a higher associated coefficient), solution 1 is preferred over solution 2.

In the example above, the terms comprise one soft constraint, however, each term in an objective function may be described as a list of soft constraints, where the list contains one or more such constraints $C_x$ and the constraints are associated with an arithmetic or logical operator. Examples of arithmetic operators include: addition, subtraction, multiplication, division, modulo, maximum, minimum etc. Examples of terms (and their associated coefficients) may therefore include, (where v represents the logical OR operator):

$0.3C_1$ $0.5(C_1)$ $0.9(C_4 v C_5 v C_{10})$

Examples of optimization functions include:

$1.0C_1$ $0.5(C_1)+0.5(C_2)$ $0.75(C_4 v C_5)+0.25(C_7 v C_{10})$ $0.1C_1+0.8(C_4 v C_5 v C_{10})+0.1(C_2 v C_3)$

It can be seen from these examples that an optimization function may comprise one or more terms and that a term may comprise one or more constraints. The order of the terms within the optimization function is not significant because the relative importance of terms is defined by the values of the associated coefficients. In these examples the logical OR operator (v) is used to associate constraints within a term and the arithmetic addition operator (+) is used to combine terms. However, this is by way of example only and any logical/arithmetic operator may be used to associate constraints and any logical/arithmetic operator may be used to combine terms. The logical/arithmetic operator used to associate constraints may be the same as or different to the operator used to combine terms. These comments are applicable to any of the examples shown herein which show specific operators by way of example only.

The attributes by which a constraint is defined may be application dependent. For example, the attributes for a music player application which enables the definition of an auto playlist may include bit rate, album title, artist, genre and keywords. Example constraints (or instantiations of attributes) may then include:

Bit rate is at least 128 kbit/s
Album title contains sea
Genre is jazz

In another example, the attributes for an online shopping application may include maximum price, minimum price, category, item, brand and keywords, with example constraints including:

Maximum price is $500
Category is electricals
Keywords contains MP3, player

Examples of operators which may be used to define constraints include "is", "is at least", "contains" and "is less than". In some examples, the operators may be application specific whilst in other examples the operators may be the same for many or all applications.

FIG. 1 shows graphical representations of four different objective (or goal) functions. Each graphical representation 101-104 shows a circle 105, referred to herein as a pie or pie chart, which is divided into regions 106 (also referred to as angular or circular sectors) which are representative of the different terms in the objective function with the relative size of the regions (e.g. in terms of central angle and/or area) being proportional to the coefficient associated with each term. The text 107 within the regions 106 identifies the soft constraints which constitute the term, in this example by listing the relevant soft constraints. The objective functions are as follows:

$101:1.0C_1$ $102:0.5(C_1)+0.5(C_7)$ $103:0.75(C_4 v C_5)+0.25(C_1)$ $104:0.50(C_4 v C_9)+0.25(C_4 v C_5 v C_8)+0.25C_1$

These graphical representations are easy to understand and provide, at a glance, an indication of the relative importance of each of the terms. When displayed in a graphical user interface (GUI), a user may be able to click on specific soft constraints in order to view the instantiation of that soft constraint or of all soft constraints. The GUI and methods which enable such graphical representations to be created is described below.

Figure 2:
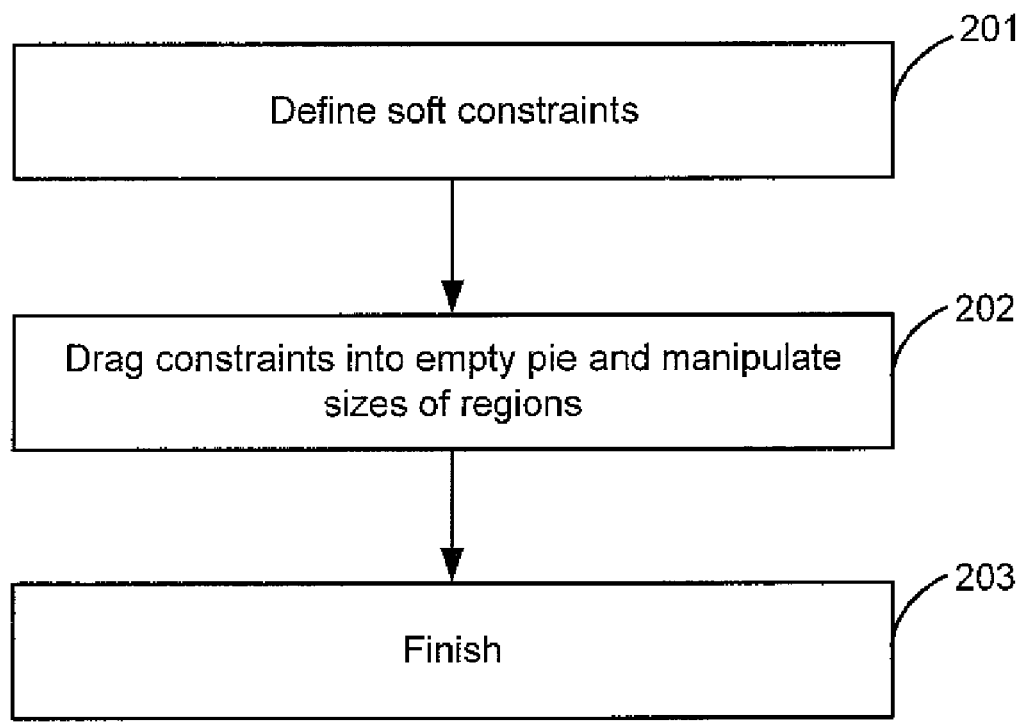
FIG. 2 shows an example method of generating an objective function.
Figure 3:
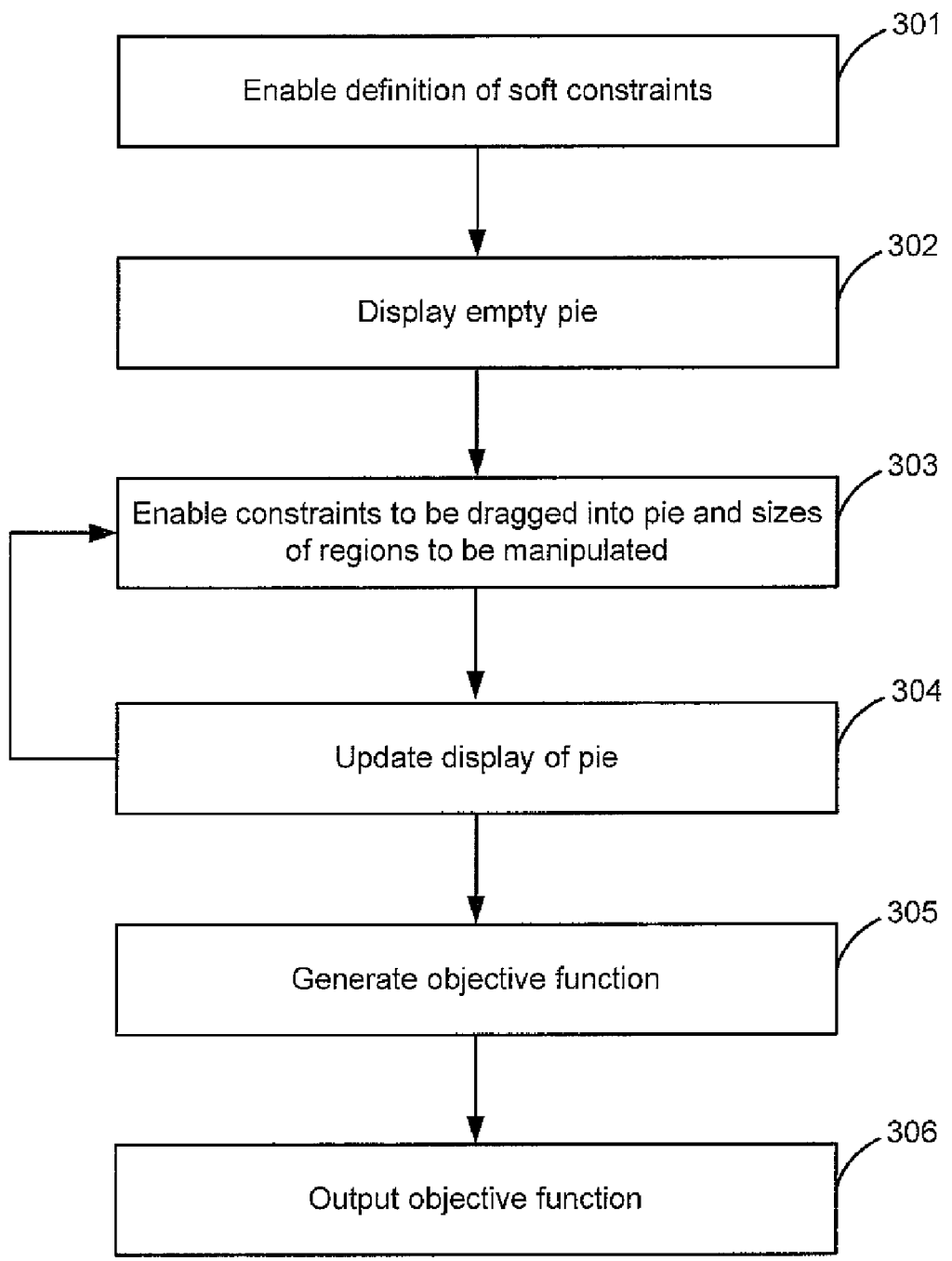
FIG. 3 shows an example method of operation of a GUI for generating an objective function.

FIG. 2 shows an example method of generating an objective function and FIG. 3 shows an example method of operation of a GUI for generating an objective function. These methods can be described with reference to FIG. 4 which shows schematic diagrams of the GUI. The generation of an objective function may start with the definition of soft constraints (steps 201, 301 or these may be predefined (e.g. within the application). The GUI displays this list of constraints 401 alongside an empty pie 402 (or other shape, step 302) and enables the user to drag and drop a constraint into the pie (steps 202, 303, as shown by arrow 403). Once a constraint has been dropped into the pie, the display of the pie is updated 404 (step 304). Further constraints may be dragged into the pie (repeating steps 202, 303, as shown by arrow 405), with the updated pie 406 then being displayed (step 304). Further examples of the dragging and dropping operations and the manipulation of the sizes of the regions are described below. Once the user has created the required objective function using these operations, they indicate that they have finished (step 203) and as a result the GUI generates the objective function (step 305), in this example 0.5 ($C_1$)+0.5 ($C_5$). This generation process involves conversion of the graphical representation into the required coefficients and this may be through a direct relationship between the central angle of a region and the coefficient (e.g. coefficient=angle in degrees/360) or between the area of the region and the coefficient (e.g. coefficient=area of region/total area). Having generated the function, it is output (step 306). The function may be output to the application which is to use it e.g. to the search engine (or tool), optimization tool, playlist generation application etc, and/or the function may be saved for future use.

It will be appreciated that many of the steps shown in FIGS. 2 and 3 (and in other FIGS.) may be performed concurrently or in different orders to that shown. For example, the objective function may be updated (through step 305) after each modification (step 303). Furthermore, the soft constraints may be modified by the user at any point in the generation of the objective function and are not necessarily all defined prior to the start of generation of the graphical representation.

Figure 4:
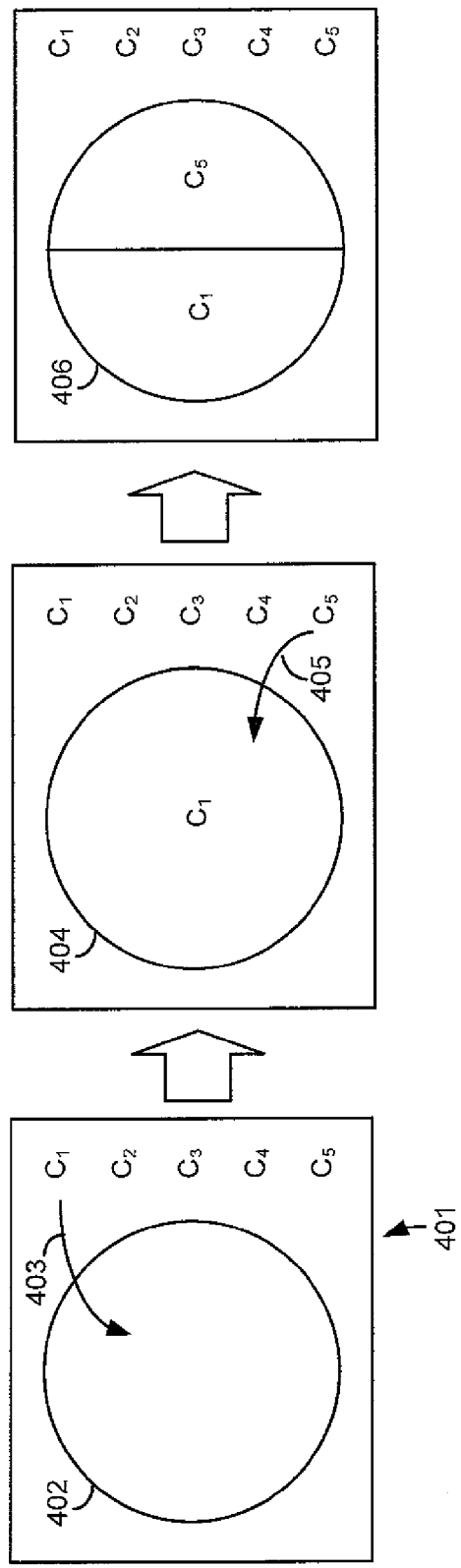
FIG. 4 shows four schematic diagrams of an example GUI.

In order to generate a required objective function, the GUI may permit the user to perform a number of different operations (e.g. dragging and dropping operations, deletion operations, undo and redo operations), such as:

Drop a constraint to a region (as shown in FIG. 4) to create a new term (and region)

Drop a constraint on an existing term, to add a constraint to that existing term Drop a constraint onto a join between two regions, which creates a new term (and region)

Drop a term in the middle of the pie, which also creates a new term (and region)

Move a frontier, which changes the coefficients associated with two of the existing terms Suppress a constraint Undo the previous operation These operations are described in more detail below. It will be appreciated that a GUI need not enable all the above operations and/or may enable operations which provide the same result.

Figure 5A:
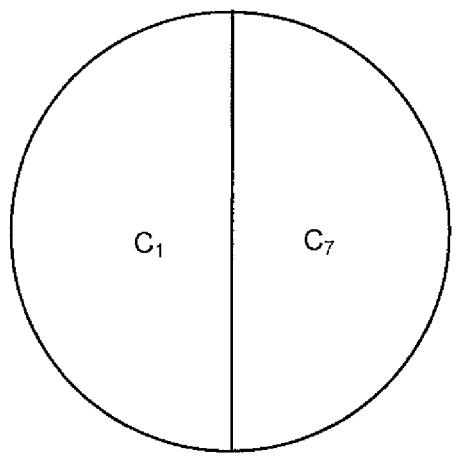
FIGS. 5A-C show schematic diagrams of the operation of dropping a constraint into a region.
Figure 5B:
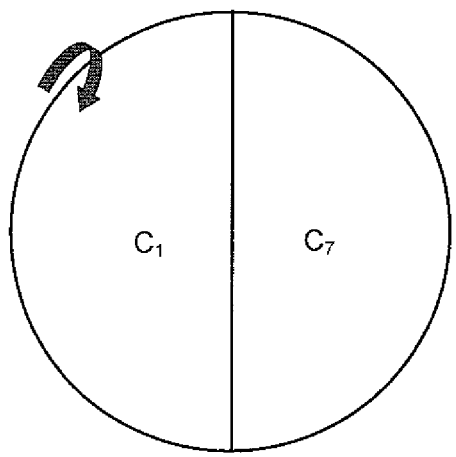
Figure 5C:
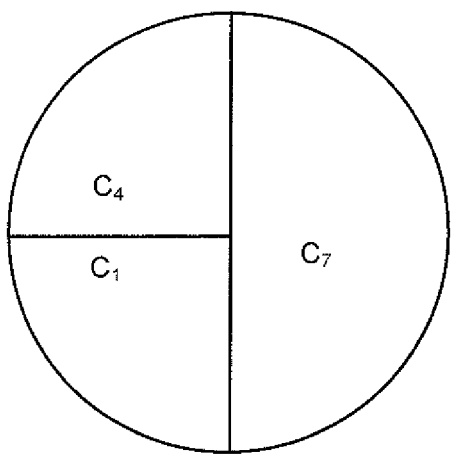

FIGS. 5A-C show schematic diagrams of the operation of dropping a constraint into a region. By dropping a constraint in any region of the pie, a new region is created by dividing the region onto which the constraint was dropped into two regions of equal size. One of the new regions keeps the term associated with the old divided region whilst the other of the new regions has a new term which is the constraint which was dropped. In the example of FIG. 5A, there are initially two regions and therefore two terms, such that the objective function is:

$$0.5(C_1)+0.5(C_7)$$

The constraint $C_4$ is dropped into the region containing the term $C_1$ (FIG. 5B) and this region is therefore split into two equal size regions such that the resultant objective function (as shown in FIG. 5C) is:

$$0.25(C_1)+0.25(C_4)+0.50(C_7)$$

At the first stage of the build of the objective function, the pie is initially empty and therefore this operation may be used to create the initial region (i.e. the first term) e.g. 1.0 ($C_1$), as shown in FIG. 1.

Figure 6A:
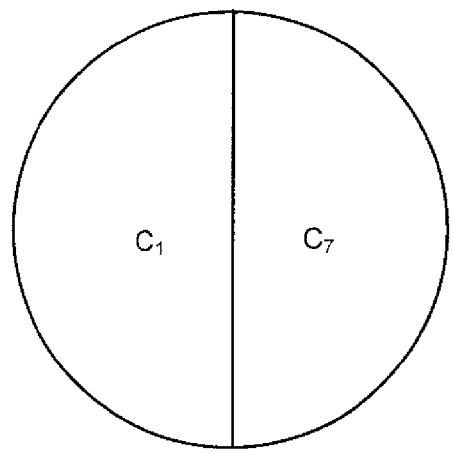
FIGS. 6A-C show schematic diagrams of the operation of dropping a constraint onto an existing term.
Figure 6B:
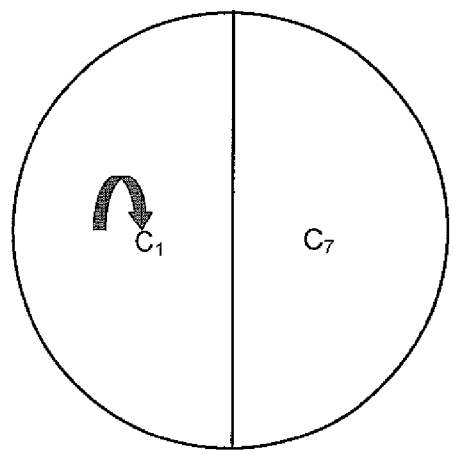
Figure 6C:
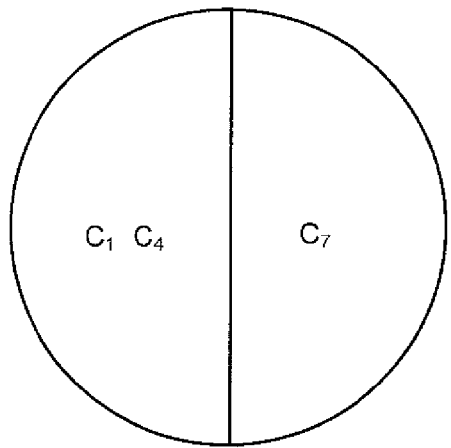

FIGS. 6A-C show schematic diagrams of the operation of dropping a constraint onto an existing term. When a region is created, the term consists of a single constraint. If a user drags a constraint and drops it on an existing term (i.e. on the text label representing the term), the soft constraint is added to that term. In the example of FIG. 6A, there are initially two regions and therefore two terms, such that the objective function is:

$$0.5(C_1)+0.5(C_7)$$

The constraint $C_4$ is dropped onto the term $C_1$ (FIG. 6B) and this term then becomes ($C_1 v C_4$) such that the resultant objective function (as shown in FIG. 6C) is:

$$0.5(C_1 v C_4)+0.50(C_7)$$

Figure 7A:
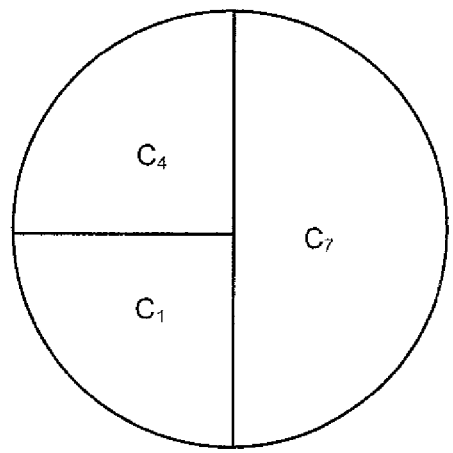
FIGS. 7A-C show schematic diagrams of the operation of dropping a constraint onto a join (or frontier) between two regions.
Figure 7B:
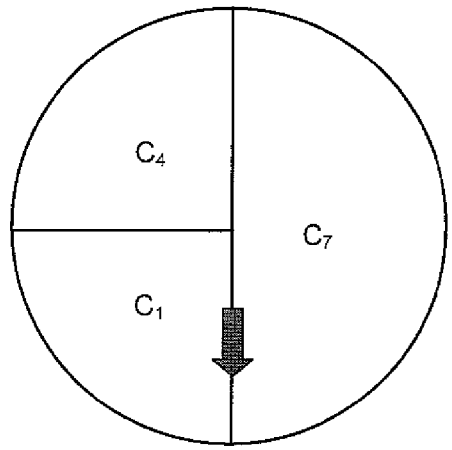
Figure 7C:
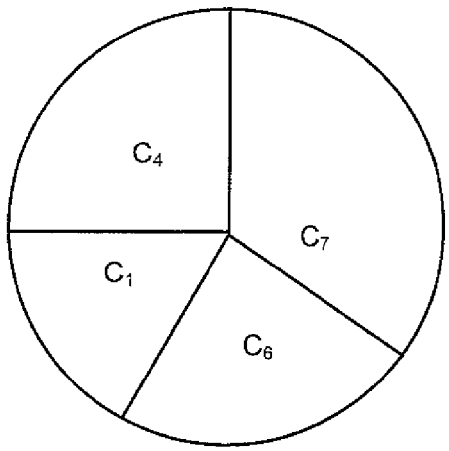

FIGS. 7A-C show schematic diagrams of the operation of dropping a constraint onto a join (or frontier) between two regions. By dropping a constraint onto such a join, a new region is created between the two existing regions and the new region has a term which is the constraint which was dropped. Each of the two existing regions gives the new region one third of its area (and therefore one third of its coefficient) such that sum of the coefficients remains equal to one. In the example of FIG. 7A, there are initially three regions and therefore three terms, such that the objective function is:

$$0.25(C_1)+0.25(C_4)+0.50(C_7)$$

The constraint $C_5$ is dropped onto the join between the regions containing the terms $C_1$ and $C_7$ (FIG. 7B). These two regions become smaller to create the new region such that the resultant objective function (as shown in FIG. 7C) is:

$$0.166(C_1)+0.25(C_4)+0.333(C_7)+0.25(C_6)$$

Whilst the example shown in FIGS. 7A-C shows a constraint being dropped onto the join between two regions of different size, if a constraint is dropped onto the join between two regions of equal size (e.g. if constraint $C_6$ is dropped on the join between the regions containing the terms $C_1$ and $C_4$ in FIG. 7A), the result of the operation is three new regions of equal size (e.g. giving a resultant objective function of 0.166 ($C_1$)+0.166 ($C_4$)+0.166 ($C_5$)+0.5 ($C_7$)).

Figure 8A:
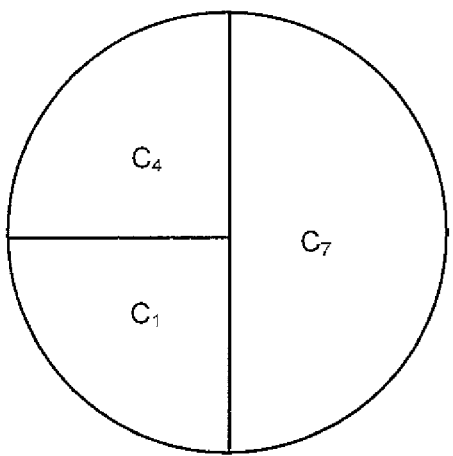
FIGS. 8A-C show schematic diagrams of the operation of dropping a constraint onto the centre of the pie.
Figure 8B:
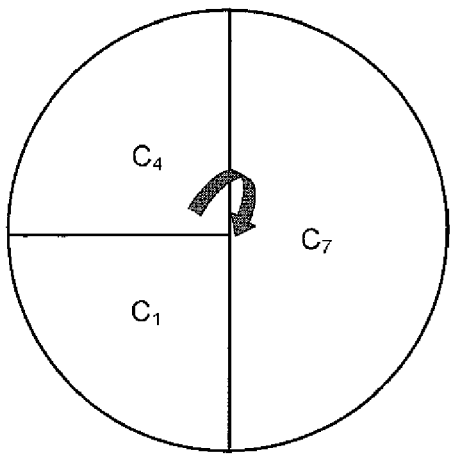
Figure 8C:
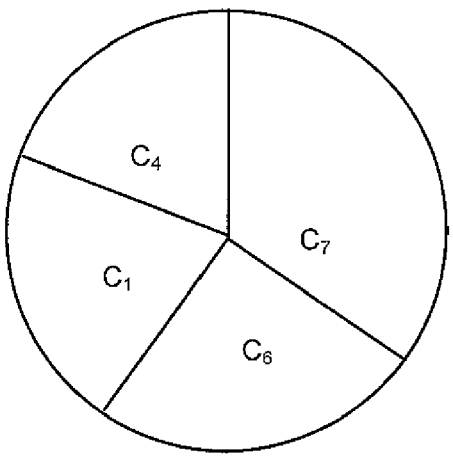

FIGS. 8A-C show schematic diagrams of the operation of dropping a constraint onto the centre of the pie. By dropping a constraint at the centre, a new region is created with the term which is the constraint which was dropped. Each of the existing regions gives the new region the same proportion of its area—one (N+1)th of its area, where N is the number of regions prior to this operation, such that the new region has an area of one (N+1)th of the pie. In the example of FIG. 8A, there are initially three regions (N=3) such that the objective function is:

$$0.25(C_1)+0.25(C_4)+0.50(C_7)$$

The constraint $C_6$ is dropped on the middle of the pie (FIG. 8B). The existing three regions become smaller by each giving up one quarter of their area to create the new region such that the resultant objective function (as shown in FIG. 8C) is:

$$0.1875(C_1)+0.1875(C_4)+0.375(C_7)+0.25(C_6)$$

Whilst the example shown in FIGS. 8A-C shows a constraint being dropped at the centre of a pie containing regions of different size, if a constraint is dropped onto the centre of a pie having regions of equal size, the result of the operation increases the number of regions by one, but each region remains of equal size (and therefore has the same coefficient).

Figure 9A:
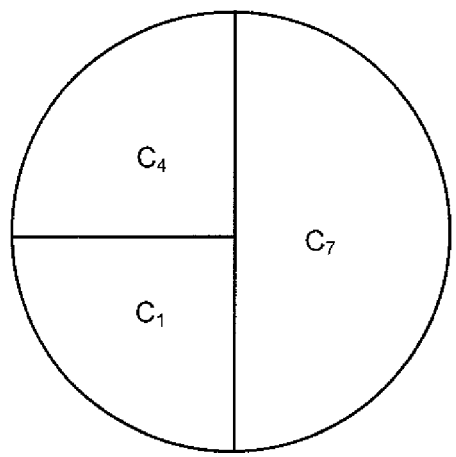
FIGS. 9A-C show schematic diagrams of the operation of moving a frontier between regions.
Figure 9B:
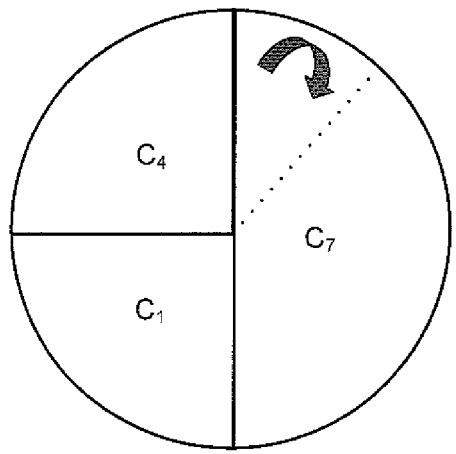
Figure 9C:
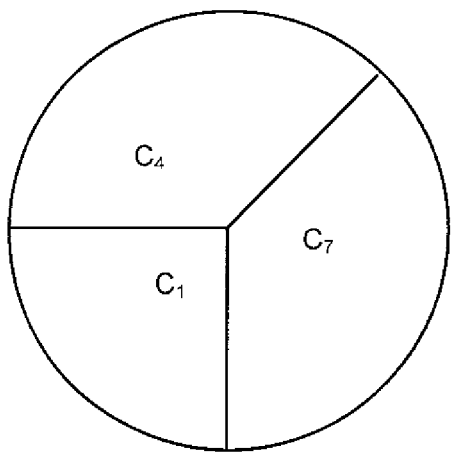

FIGS. 9A-C show schematic diagrams of the operation of moving a frontier between regions. The user may use its pointer (e.g. the mouse cursor) to select a frontier between two regions and apply a rotating move on it, which changes the angular sector associated with the two regions. The two corresponding coefficients are modified according to the rotation applied, such that the sum of the coefficients remains equal to one. In the example of FIG. 9A, there are initially three regions such that the objective function is:

$$0.25(C_1)+0.25(C_4)+0.50(C_7)$$

The frontier between the two regions having terms $C_4$ and $C_7$ is moved in a clockwise direction (FIG. 9B). The region having the term $C_4$ increases in size whilst the region having the term $C_7$ decreases in size by the same amount such that the resultant objective function (as shown in FIG. 9C) is:

$$0.25(C_1)+0.375(C_4)+0.375(C_7)$$

As moving the frontier may not be particularly accurate, the GUI may provide a snap functionality in predefined increments (e.g. incremental coefficient values of 0.1 or angles of 10°). Where a frontier is moved such that a region is of zero size, i.e. a frontier is moved such that it coincident with another frontier, the term associated with the region of zero size is deleted from the objective function. For example, if the frontier between the regions having terms $C_4$ and $C_7$ is moved in a clockwise direction (as in FIG. 9B) such that it is coincident with the frontier between the regions having terms $C_7$ and $C_1$, then the region having the term $C_7$ disappears and the resultant objective function is:

$$0.25(C_1)+0.75(C_4)$$

Figure 10A:
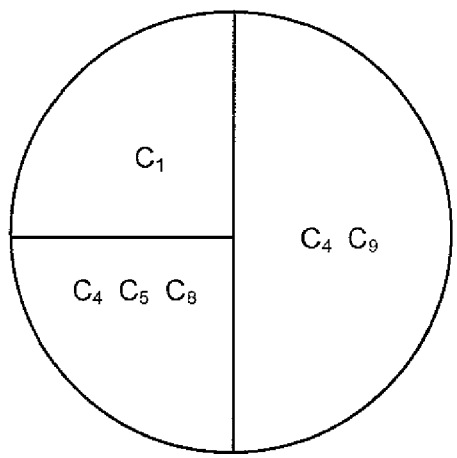
FIGS. 10A-C show schematic diagrams of the operation of suppressing (or deleting) a coefficient.
Figure 10B:
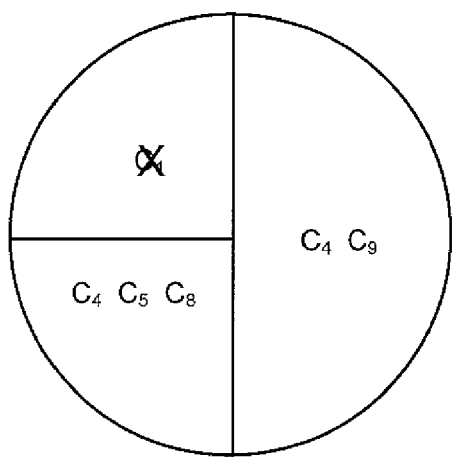
Figure 10C:
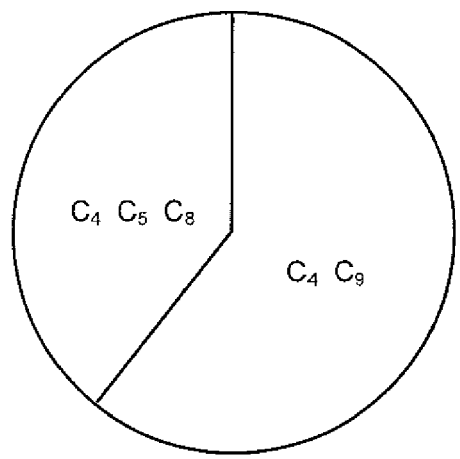

FIGS. 10A-C show schematic diagrams of the operation of suppressing (or deleting) a coefficient. A coefficient may be deleted from within a term (not shown in FIGS. 10A-C) in which case the overall shape of the graphical distribution remains the same whilst the labels within a region change. However, if the last constraint within a term is deleted, the term is deleted altogether along with the region which related to that term. Each of the remaining regions grows in size as the coefficient associated with the deleted term is distributed among the remaining regions. The manner in which the coefficient associated with the deleted term is distributed may, in a first example, result in each remaining region receives one (N−1)th of the coefficient of the deleted region, where N is the number of regions prior to this operation. In the example of FIG. 10A, there are initially three regions (N=3) such that the objective function is:

$$0.50(C_4vC_9)+0.25(C_1)+0.25(C_4vC_5vC_8)$$

The constraint $C_1$ is deleted (FIG. 10B) and the remaining two regions become larger by each gaining half of the area of the deleted region such that the resultant objective function (as shown in FIG. 10C) is:

$$0.625(C_4vC_9)+0.375(C_4vC_5vC_8)$$

In a second example of the manner in which the coefficient associated with the deleted term is distributed, each remaining region may receive a proportion of the coefficient of the deleted region according to its size relative to the other remaining regions. For example, as shown in FIG. 10A, there are initially three regions such that the objective function is:

$$0.50(C_4vC_9)+0.25(C_1)+0.25(C_4vC_5vC_8)$$

The constraint $C_1$ is deleted (FIG. 10B) and the remaining two regions become larger by each gaining a proportion of the deleted region. Of the two remaining regions, the larger region (having the term ($C_4vC_9$)) is twice the size of the smaller region (having the term ($C_4vC_5vC_8$)) and therefore the larger region gains two thirds of the deleted region and the smaller region gains one third. This maintains the relative size of the two remaining regions, such that the resultant objective function is:

$$0.666(C_4vC_9)|0.333(C_4vC_5vC_8)$$

As described above, a GUI need not implement all of the above operations, because permitted operations may be restricted and because the same result may be achieved using different combinations of operations. In an example, a GUI may permit the user to perform the following set of operations:

Drop a constraint to a region (as shown in FIGS. 5A-C)
Drop a constraint on an existing term (as shown in FIGS. 6A-C)
Move a frontier (as shown in FIGS. 9A-C)
Suppress a constraint (as shown in FIGS. 10A-C)

In this example, the operation to move a frontier may be used in order to achieve the same effects as provided by the two dropping operations described above with reference to FIGS. 7A-C and 8A-C. In another example, a GUI may permit the user to perform the following set of operations:

Drop a term in the middle of the pie (as shown in FIGS. 8A-C)
Drop a constraint on an existing term (as shown in FIGS. 6A-C)
Move a frontier (as shown in FIGS. 9A-C)

In such an example, a user may move frontiers in order to achieve the same effect as the operation to suppress a constraint (as described above with reference to FIGS. 10A-C).

As described above, once the required graphical representation of an objective function has been generated by a user via the GUI (steps 202, 303, 304), the GUI generates (step 305) and outputs the objective function (step 306). This objective function may be stored for future use and/or output to an application for use.

Figure 11:
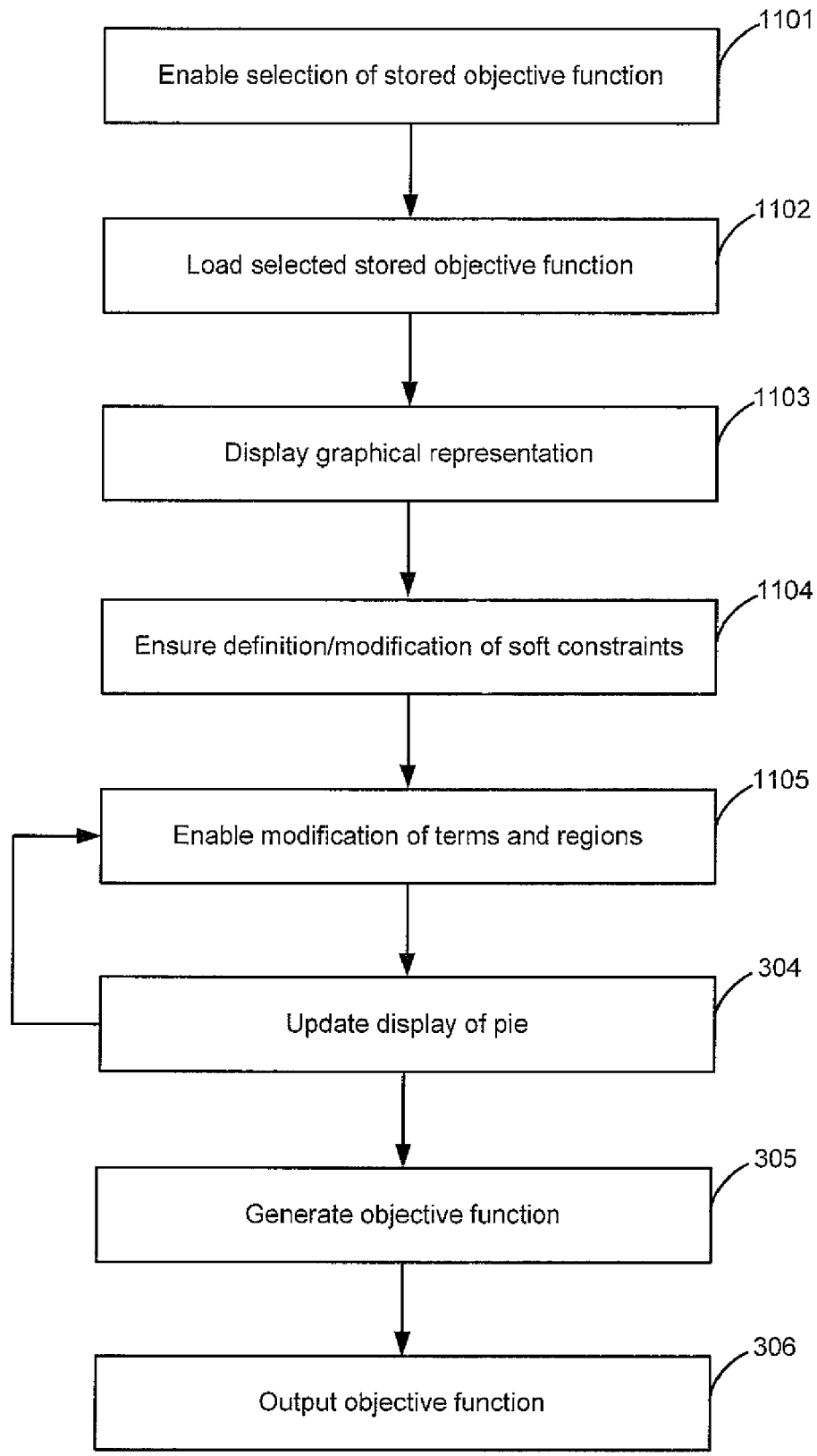
FIG. 11 shows a second example method of operation of a GUI for generating an objective function.

Instead of generating a new objective function from a blank pie, as shown, the GUI may enable a user to load and modify a stored objective function, as shown in FIG. 11. The GUI enables the user to select a stored objective function (step 1101). This stored objective function may be one which has previously been created and stored by a user (e.g. using one of the methods shown in FIGS. 2 and 11) or may be a template function (e.g. provided for a particular application). The stored objective may be stored as part of a user profile within an application or may be stored independent of the application. This may be particularly beneficial where a user performs repeat searches (e.g. a holiday search) but where only small changes in the details are required (e.g. the values for attributes, such as the holiday dates). Once the function has been selected, it is loaded (step 1102) and its graphical representation displayed (step 1103). The GUI then may enable the definition and/or modification of the soft constraints (step 1104) and the modification of the terms and/or regions (step 1105). These modification steps may use the same operations as described above and shown in FIGS. 5A-C to 10A-C. Once a modification to a term or region has been performed, the graphical representation is updated (step 304) and once modifications are complete, the objective function is generated (step 305) and output (step 306).

The modifications enabled may include use of the same constraints but modification of the values associated with constraints (e.g. from color=Red to color=Blue) or use of the same weights but different constraints etc.

Whilst in the above description, the GUI enables definition and/or modification of soft constraints, in some applications, the soft constraints or the terms may be predefined.

Figure 12:
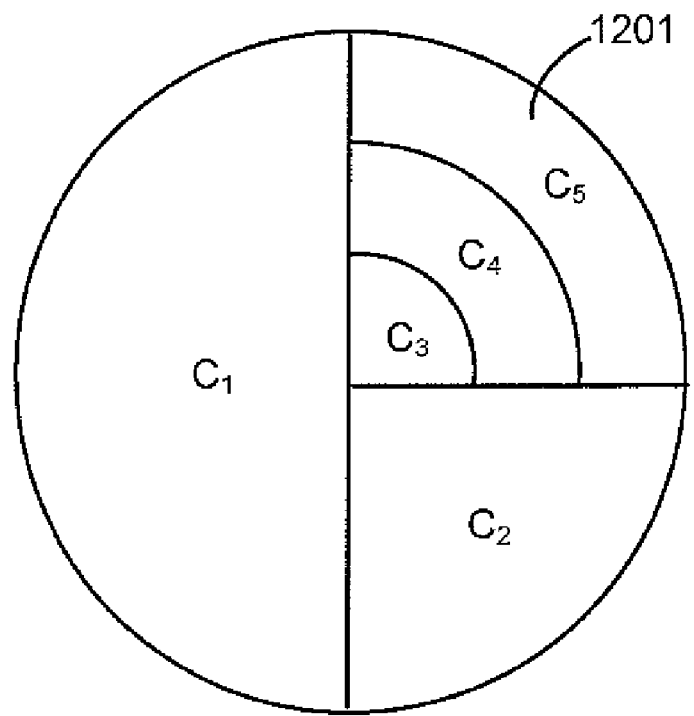
FIG. 12 shows a schematic diagram of another example GUI.

The GUI described above generates an objective function in which the order of the terms within the optimization function is not significant because the relative importance of terms is defined by the values of the associated coefficients. Similarly, the order of the constraints within a term (e.g. within ($C_4vC_5vC_8$)) may not be significant. However, in an example, the relative importance of particular constraints within a term may be indicated using the GUI, as shown in FIG. 12, by placing constraints within annular portions 1201 within a region; each annular portion 1201 indicating a different importance level within the particular term in such an example, the relative importance of a constraint may be indicated by the relative size of the annular portions, (e.g. $C_3$ is more important than $C_4$ which is more important than $C_5$, in the example shown in FIG. 12). This importance level may translate to a coefficient associated with each constraint or may be used to prioritize solutions where the objective function provides equal values.

In the above description, a circular pie is used for the graphical representation. Whilst a circular area may be optimum because of the one to one relationship between area and angle of a region, any other shape may be used (e.g. an ellipse, a square etc). For example, shapes may be selected which are relevant to the particular application (e.g. a car-shape for a car sales search tool) and in such an instance the coefficients may be related to the area, the angle or any other size related parameter of a region of the shape.

In the examples described above, each region comprises an angular sector of the circular pie. In other examples, the shape may be divided in a different manner, e.g. each region may be annular or any portion of the total shape. In such examples, the coefficients may be related to any size related parameter of the region (e.g. area, circumference, thickness etc).

Whilst in the above description the logical OR operator (v) is used to associate constraints within a term and the arithmetic addition operator (+) is used to combine terms, this is by way of example only. Any logical/arithmetic operator may be used to associate constraints and any logical/arithmetic operator may be used to combine terms. Examples of objective functions therefore include, where $\otimes$ and $\oplus$ represent any logical/arithmetic operators:

$$1.0 C_1$$

$$0.5(C_1) \otimes 0.5(C_7)$$

$$0.75(C_4 \oplus C_5) \otimes 0.25(C_1)$$

$$0.50(C_4 \oplus C_9) \otimes 0.25(C_4 \oplus C_5 \oplus C_8) \otimes 0.25 C_1$$

It will be appreciated that more than two different operators may be used within an objective function and that different terms may use different operators to associate constraints.

The GUI described above may be used to define/modify an objective function for use in any application including search engines, optimization tools, database management tools etc. For example, the GUI may be used to define or modify an objective function for use in image optimization in an image processing tool. In such an example, the GUI may be used to define an objective function used to sharpen an image by enabling a user to adjust the different weights applied to particular parameters (e.g. different filters) which have been defined within the application to adapt an image.

The methods and GUI described above provide a user with an easy way to define an objective function, without requiring detailed understanding of any mathematical principles. A user can visually define the relative priorities of different constraints (or combinations of constraints) without needing to calculate or consider coefficient values. As a result, the GUI can be operated by users of all abilities. The GUI guarantees that the coefficients used always add to one (or to the specified value, where the application uses a value which is not equal to one).

Although the methods and GUI described above refer to the generation of an objective (or goal) function, the methods and GUI may be used to generate other types of mathematical function, such as classical functions.

Figure 13:
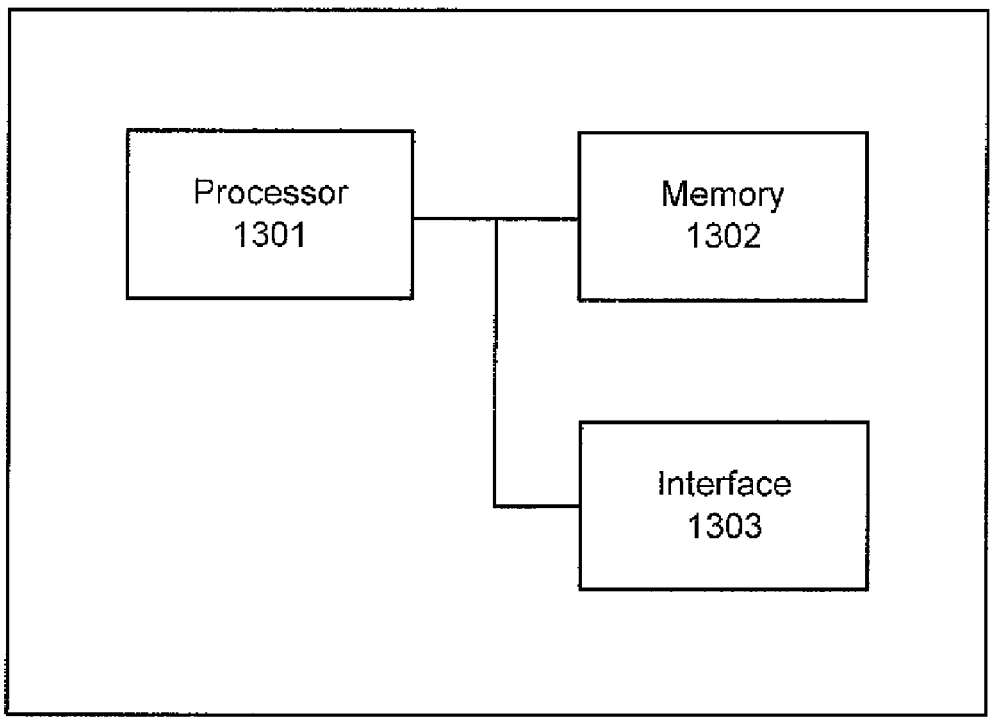
FIG. 13 shows a schematic diagram of an apparatus on which the GUI may operate.

The GUI may be implemented as a standalone application or may be integrated into an application which uses an objective function (or other mathematical function which is generated using the GUI). The application may operate on apparatus as shown in FIG. 13 which comprises a processor 1301, a memory 1302 arranged to store executable instructions to cause the processor to perform methods as described above, and an interface 1303 to receive user inputs. The memory 1302, which may be removable, may also be used to store the resultant objective function and/or objective function templates, or alternatively a separate memory element may be provided either within the apparatus or elsewhere but accessible from the apparatus. Where the application is running on an apparatus operated by the user (e.g. a PC), the interface may be to a user input device (e.g. a keyboard and/or mouse). In another example, the application may run remotely (e.g. on a web server) and the interface may be to the network such that remote user input data may be received.

Although the present examples are described and illustrated herein as being implemented in a system as shown in FIG. 13, the system described is provided as an example and not a limitation. As those skilled in the art will appreciate, the present examples are suitable for application in a variety of different types of computing devices and using a variety of different user input means.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

The methods described herein may be performed by software in machine readable form on a storage medium. The software can be suitable for execution on a parallel processor or a serial processor such that the method steps may be carried out in any suitable order, or simultaneously. For example, the software may comprise a computer program comprising computer program code means adapted to perform all the steps of any of the methods described herein when the program is run on a computer. This computer program may be embodied on a computer readable medium.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

It will be understood that the benefits and advantages described above may relate to one embodiment or may relate to several embodiments. It will further be understood that reference to 'an' item refer to one or more of those items.

The steps of the methods described herein may be carried out in any suitable order, or simultaneously where appropriate.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. A system arranged to:
   display a graphical representation of a shape;
   enable a user to manipulate said graphical representation by dropping one or more constraints into said shape to divide said shape into a plurality of regions and to associate a term with each of said plurality of regions, each term comprising at least one constraint, and each region comprising a frontier that represents a boundary of the region, an area within the frontier, and a region identifier within the area, the region identifier identifying the region associated with the frontier and the area; and
   generate a mathematical function comprising for each of said plurality of regions, the mathematical function being a first mathematical function if the dropping of the one or more constraints occurs on the frontier between two regions, the mathematical function being a second mathematical function if the dropping of the one or more constraints occurs on the area of the region, and the mathematical function being a third mathematical function if the dropping of the one or more constraints occurs on the region identifier of the region.

2. The system according to claim 1, wherein said mathematical function is an objective function.

3. The system according to claim 1, further arranged to:
   enable a user to manipulate said graphical representation moving a frontier between two of said plurality of regions.

4. The system according to claim 1, further arranged to:
   enable a user to manipulate said graphical representation by deleting constraints.

5. The system according to claim 1, wherein said size of said region comprises a central angle of said region and wherein said coefficient is proportional to said angle.

6. The system according to claim 1, wherein said size of said region comprises an area of said region and wherein said coefficient is proportional to said area.

7. The system according to claim 1, further arranged to:
   enable a user to define a constraint.

8. The system according to claim 1, wherein said shape comprises a circle and wherein each said region comprises an angular sector of said circle.

9. The system according to claim 1 arranged for use as a search tool.

10. The system according to claim 1 arranged for use as an optimization tool.

11. A method of interacting with a user, the method comprising:
    displaying a graphical representation of a shape comprising a frontier that represents a boundary of the shape, an area within the frontier, and a shape identifier within the area, the shape identifier identifies the region associated with the frontier and the area;
    receiving inputs from said user to manipulate said graphical representation, said inputs corresponding to operations to drop constraints onto the shape identifier for the shape that is located inside the area to divide said shape into a plurality of regions and to associate a term with each of said plurality of regions, each term comprising at least one constraint, the at least one constraint comprising an attribute that defines the constraint, a logical or arithmetic operator, and a coefficient; and
    generating a mathematical function comprising for each of said plurality of regions, said associated term and said coefficient calculated based on a size of said region.

12. A method according to claim 11, wherein said mathematical function is an objective function.

13. A method according to claim 11, further comprising:
    receiving an input from said user to manipulate said graphical representation, said input corresponding to an operation to move a frontier between two of said plurality of regions.

14. A method according to claim 11, further comprising:
    receiving an input from said user to manipulate said graphical representation, said input corresponding to an operation to delete a constraint.

15. A method according to claim 11, wherein said size of said region comprises a central angle of said region and wherein said coefficient is proportional to said angle.

16. A method according to claim 11, wherein said size of said region comprises an area of said region and wherein said coefficient is proportional to said area.

17. A method according to claim 11, wherein said shape comprises a circle and wherein each said region comprises an angular sector of said circle.

18. A method of interacting with a user, the method comprising:
    displaying a first graphical representation of a first mathematical function, said graphical representation comprising a shape divided into a plurality of regions, each of said plurality of regions, each region comprising:
      a frontier that represents a boundary of the region, an area within the frontier, and a region identifier within the area, the region identifier identifies the region associated with the frontier and the area;
      an associated term comprising at least one constraint, comprising an attribute that defines the constraint, a logical or arithmetic operator, and a coefficient;
    receiving an input from said user to modify said plurality of regions to create a second graphical representation; and
    generating a second mathematical function comprising for each of said plurality of regions in said second graphical representation, said associated term and the coefficient calculated based on a size of said region.

19. A method according to claim 18, said input corresponding to an operation to move a frontier between two of said plurality of regions.

20. A method according to claim 18, said input corresponding to an operation to drop a constraint into said shape.

* * * * *

UNITED STATES PATENT AND TRADEMARK OFFICE
CERTIFICATE OF CORRECTION

PATENT NO. : 7,975,234 B2  Page 1 of 1
APPLICATION NO. : 11/548399
DATED : July 5, 2011
INVENTOR(S) : Youssef Hamadi et al.

It is certified that error appears in the above-identified patent and that said Letters Patent is hereby corrected as shown below:

In Title page, in field (75), under "Inventors" column 1, line 2, delete "Stephanie Ubeda" and insert -- Stephane Ubeda --, therefor.

Signed and Sealed this
Twenty-third Day of August, 2011

David J. Kappos
*Director of the United States Patent and Trademark Office*